United States Patent

Meyer et al.

[11] Patent Number: 5,954,317
[45] Date of Patent: Sep. 21, 1999

[54] HYDRAULICALLY DAMPING RUBBER BEARING

[75] Inventors: Heinrich Meyer, Königswinter; Detlef Waloszyk, Titz, both of Germany

[73] Assignee: Boge GmbH, Bonn, Germany

[21] Appl. No.: 08/937,645

[22] Filed: Sep. 24, 1997

[30] Foreign Application Priority Data

Sep. 26, 1996 [DE] Germany .......................... 196 39 557
Jul. 9, 1997 [DE] Germany .......................... 197 29 290

[51] Int. Cl.$^6$ ...................................................... F16F 9/04
[52] U.S. Cl. ........................................ 267/140.12; 180/312
[58] Field of Search ....................... 267/140.11, 140.12, 267/140.13, 217, 219; 180/300, 312; 248/636, 562

[56] References Cited

U.S. PATENT DOCUMENTS

| | | | |
|---|---|---|---|
| 4,953,833 | 9/1990 | Schmidt et al. | 267/140.11 |
| 5,102,106 | 4/1992 | Thelamon et al. | 267/140.11 |
| 5,221,077 | 6/1993 | Noguchi | 267/140.12 |
| 5,509,643 | 4/1996 | Carstens et al. | 267/140.11 |
| 5,558,316 | 9/1996 | Lee et al. | 267/140.12 |
| 5,657,510 | 8/1997 | Satori et al. | 267/140.11 |

FOREIGN PATENT DOCUMENTS

| | | |
|---|---|---|
| 2755117 | 6/1979 | Germany . |
| 3818287 | 12/1989 | Germany . |

*Primary Examiner*—Robert J. Oberleitner
*Assistant Examiner*—Robert A. Siconolfi
*Attorney, Agent, or Firm*—Nils H. Ljungman & Associates

[57] ABSTRACT

Hydraulically damping rubber bearing, consisting of an inner tube, an outer tube located concentrically or eccentrically in relation to the inner tube and at some distance from it, and a rubber part inserted between them in which there are at least two chambers which are filled with damping fluid and are hydraulically connected to one another, whereby in each of at least two chambers there are respective stop bodies, whereby the stop bodies are connected to one another by means of an element which has a hydraulic connection, the element thereby has a groove which is open toward the radial outside and is located on the inside of the outer tube so that the groove, together with the inside of the outer tube, forms the flow connection, whereby the element is realized in one piece, and whereby the element has an opening over its axial length, the clear width of which opening is larger than the diameter of the inner tube.

19 Claims, 5 Drawing Sheets

HYDRAULICALLY DAMPING RUBBER BEARING

BACKGROUND OF THE INVENTION

1. Field of the Invention

This invention relates to a hydraulically damping rubber or elastomeric bearing which bearing comprises an inner tube, an outer tube located concentrically or eccentrically in relation to the inner tube and at some distance from the inner tube, and a rubber part inserted between the inner tube and the outer tube. In the bearing are at least two chambers which are filled with damping fluid and are hydraulically connected to one another. In each chamber there is a stop body, which stop bodies are connected to one another by an element which has a hydraulic connection. The element thereby has a groove which is open toward the radial outside and is located on the inside of the outer tube so that the groove, together with the inside of the outer tube, forms the hydraulic connection.

2. Background Information

Such known rubber bearings are disclosed in, e.g., German Patent No. 36 17 787 C2, in which the chambers are provided with stop bodies, and in which the hydraulic connection between the two chambers is located in a rigid element. Because the rigid element runs over the entire periphery, an installation is required for the assembly of this element in the outer tube. Accordingly, the element must be realized in two parts.

Because the element is located over the entire periphery of the outer part and is held on both sides of the rubber part, one disadvantage is that when radial loads are applied to the bearing, on one hand the useful life of the bearing is reduced, and on the other hand there is an overflow of the damping medium between the web of the rubber part and the element.

Also known are rubber bearings (e.g. European Patent No. 0.656.487 A1), in which there is a hydraulic connection between the two chambers. The element which has the hydraulic connection is realized in the form of a fold-up component, whereby the hydraulic connection is located in the plug-in or receiving terminal area of the element. The hydraulic connection therefore can only be realized so that it continues just into the respective chamber, which means that greater channel lengths cannot be realized on account of the configuration of the stop bodies. The hydraulic connection specifically runs on the inside wall of the element.

Also known are rubber bearings (e.g. German Patent No. 27 55 117) which comprise an outer bearing sleeve and an inner part which is held inside by an elastomer body, whereby the elastomer body, above and below the inner part, has recesses which function as a spring travel chamber. In this embodiment, no provision is made for hydraulic damping by damping medium. The metal inner part is provided on one of the outer sides adjacent to the recesses with a recess which runs in the longitudinal direction and in which an elastic stop body is inserted.

Also known are hydraulically damping rubber bearings (e.g. German Patent No. 38 18 287), in which stop bodies are provided outside the chamber which chamber is filled with the damping medium. These stop bodies take up a correspondingly large amount of space which is not available under all installation conditions, so that in such cases, alternative construction solutions must be used.

OBJECT OF THE INVENTION

The object of the present invention is to create a hydraulically damping rubber bearing in which there is an economical stop body and a hydraulic connection which is easy to create from a manufacturing point of view, and whereby, moreover, the friction or the rubbing noises between the stop body and any counter stop which may be present are minimized.

SUMMARY OF THE INVENTION

The present invention teaches that this object can be accomplished by realizing the element in one piece, whereby the element, over its axial length, has an opening, the clear width of which opening is greater than the diameter of the inner tube.

Another possible object of the present invention can be realized by locating respective stop bodies in at least two chambers, whereby the stop bodies are connected to one another by means of an element which has a hydraulic connection.

One advantage of this arrangement is that the stop bodies, together with the element, after the vulcanization of the rubber part on the inner part, can be transferred to the next stage of the assembly process as a complete assembly.

An additional essential teaching of the invention is that the stop bodies are fixed on the inside of the outer tube. In this case, it is advantageous that the friction diameter is small, and thus the friction or the rubbing noises between the stop body and the corresponding stop can be minimized.

In one embodiment of the invention which is simple from the point of view of manufacturing, the element, in the vicinity of the opening, has projections which projections provide support on the rubber part. One advantage of this arrangement is that the projections are supported on the rubber part, so that the element is in contact under bias with the outer tube, and therefore a correct cross section of the hydraulic connection is retained.

In another embodiment of the present invention, a hydraulic connection between the chambers is created because the element has a groove which is open toward the radial outside, and the element is located on the inside of the outer tube so that the groove, together with the inside of the outer tube, forms the hydraulic connection.

The assembly can be made captive by realizing the stop bodies and the element in one piece.

In an additional embodiment, the stop bodies have a higher hardness, or are firmer or harder than the rubber part. One advantage of this configuration is that as a result of the different material pair, higher radial forces can be absorbed by the stop bodies over the long term.

In an additional advantageous configuration, the stop bodies and/or the element are made of plastic and/or hard rubber and/or metal.

In an additional embodiment, the inner part is provided with elastic projections which interact with the stop bodies. The elastic projections, together with the rubber part, can thereby be attached directly to the inner tube in one process. All that is required to manufacture the projections is an appropriate configuration of the vulcanizing mold.

In an additional embodiment, the stop body has a surface which is provided with elevations and/or depressions. The advantage of this measure is that friction can be minimized both by the selection of the plastic material and the selection of the surface. To make the elevations and depressions, there are harmonically corrugated surfaces with closed pockets or pouches or depressions, (similar to the surface of a golf ball), so that when the rubber part comes into contact with plastic stop bodies, damping fluid can be enclosed in these elevations or depressions, so that the friction can also be minimized by a hydrostatic effect.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Preferred embodiments of the invention are illustrated schematically in the accompanying drawings, wherein.

DESCRIPTION OF THE PREFERRED EMBODIMENT

Figure 1:
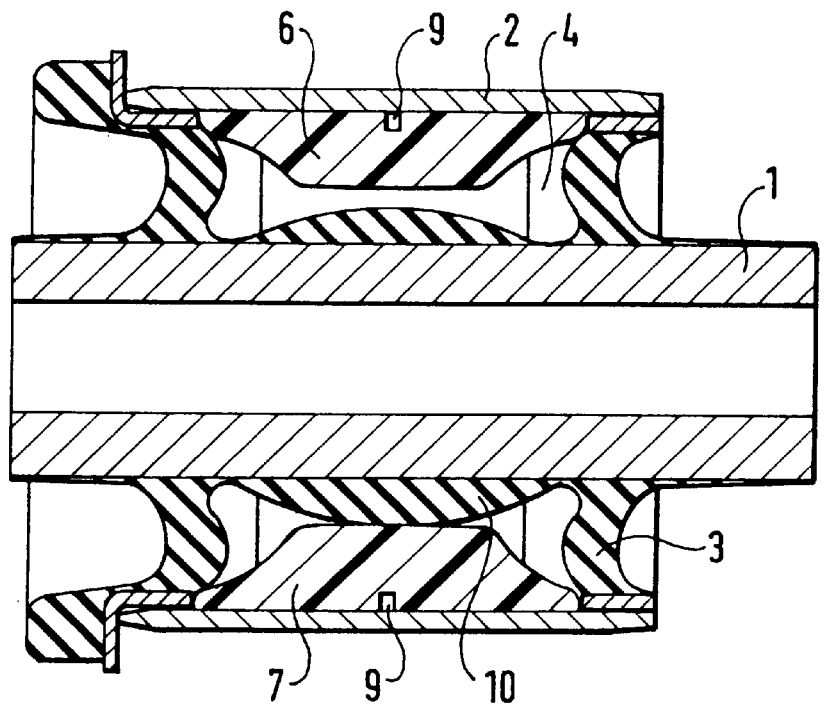
FIGS. 1 and 2 show a hydraulically damping rubber bearing in cross section with two external stop bodies made of plastic.
Figure 2:
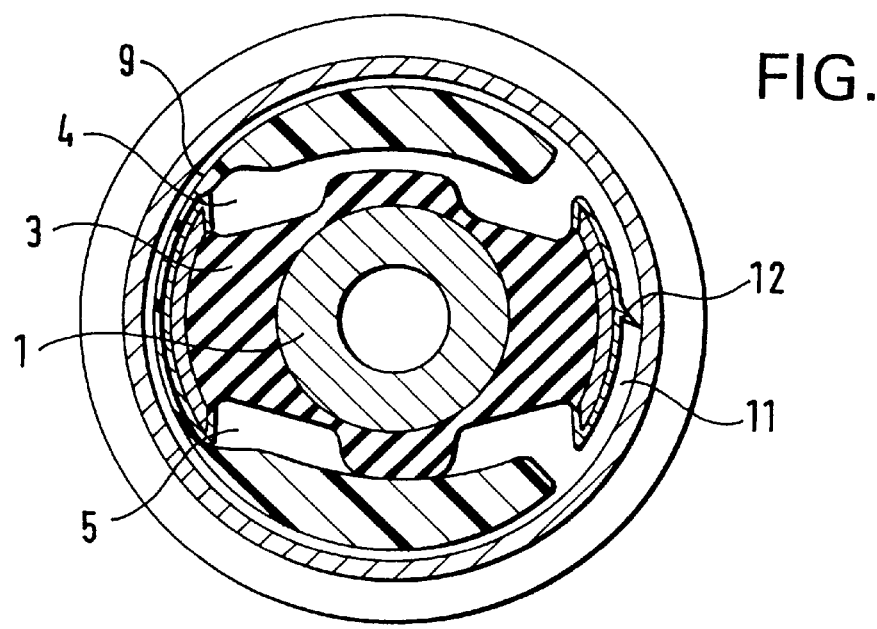

The hydraulically damping rubber bearing illustrated in FIGS. 1 and 2 includes an inner tube 1 and an outer tube 2 located concentric to the inner tube 1 and at some distance from it, whereby the rubber part 3 inserted between the inner tube 1 and the outer tube 2 has chambers 4 and 5, which chambers 4 and 5 are filled with damping medium. These chambers 4 and 5 filled with damping medium are hydraulically connected to one another. The rubber part 3 is firmly and non-detachably connected to the inner tube 1 and is firmly connected to the outer tube 2.

Figure 3:
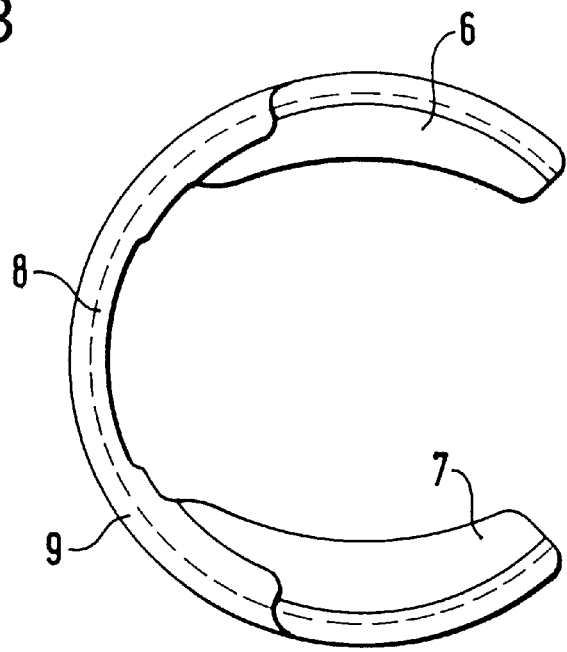
FIG. 3 shows two stop bodies as isolated parts.

The chambers 4 and 5 each have respective stop bodies 6 and 7, which stop bodies 6 and 7 are located directly on the outer tube 2, whereby the stop bodies 6 and 7 are connected to one another by means element 8 (see FIG. 3). The stop bodies 6 and 7 are realized in one piece together with the element 8, and are essentially U-shaped. Because of this one-piece U-shaped construction, after the vulcanization of the rubber part 3 on the inner tube 1, the stop bodies 6 and 7 can be inserted sideways, together with the element 8, in the vicinity of the chambers 4 and 5, before the outer tube 2 is assembled.

To form a spiral-shaped or ring-shaped hydraulic connection 9, there is a groove on the outside surface both in the stop bodies 6 and 7 and also in the element, which groove, together with the inner wall of the outer tube 2, forms the boundaries of the hydraulic connection 9. In this case, not only can a ring-shaped flow connection 9 be created, but also grooves which have a meander shape, so that the length of the hydraulic connection 9 can be varied, depending on the geometry of the groove on the outside surface of the stop bodies 6 and 7 or of the element 8.

The stop bodies 6 and 7 are made of plastic or a similar material which has a hardness which is greater than that of the projections 10 so that, depending on the material pair selected, a corresponding damping characteristic can be achieved. In this embodiment, the projections 10 were formed during the vulcanization of the rubber part 3, and have the same material characteristics as the rubber part 3.

In the right half of FIG. 2, parallel to the hydraulic connection 9, there is a bypass connection 11, whereby a non-return valve 12 in the form of a rubber lip allows the damping medium to pass only above a specified overpressure. The rubber lip can be symmetrical or asymmetrical, so that the non-return valve 12 can be active in both directions of flow, or only in one direction of flow.

To reduce rubbing noises or to achieve additional damping characteristics, the surface of the stop bodies 6 or 7 and/or the surface of the projections 10 is provided with elevations or depressions in which damping medium can be enclosed.

Figure 3A:
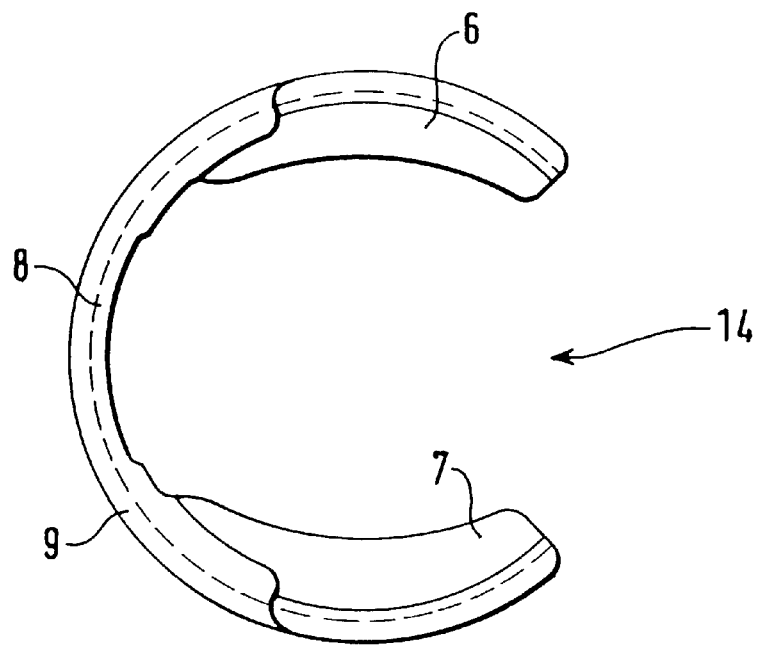
FIG. 3A shows additional detail of the view shown in FIG. 3.
Figure 4:
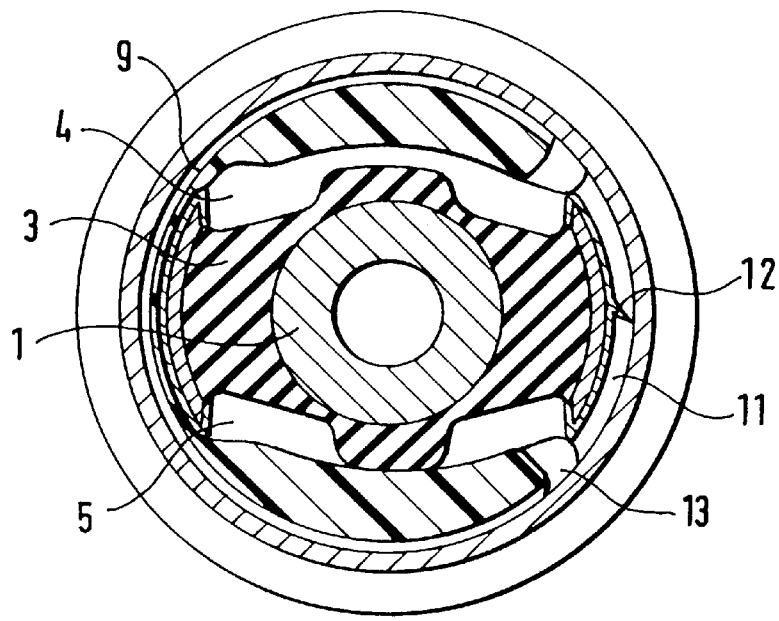
FIGS. 4, 5, and 6 illustrate an additional embodiment of a rubber bearing.
Figure 4A:
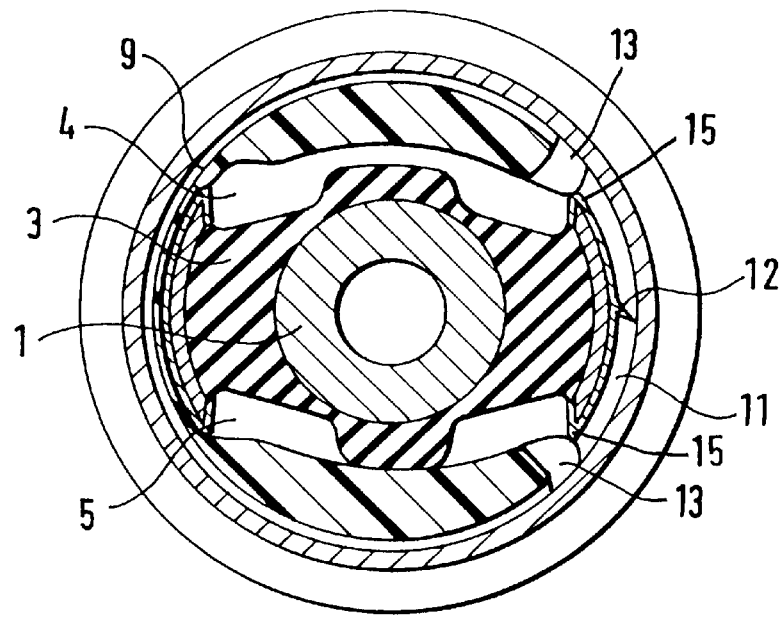
FIG. 4A shows additional detail of the view shown in FIG. 4.
Figure 5:
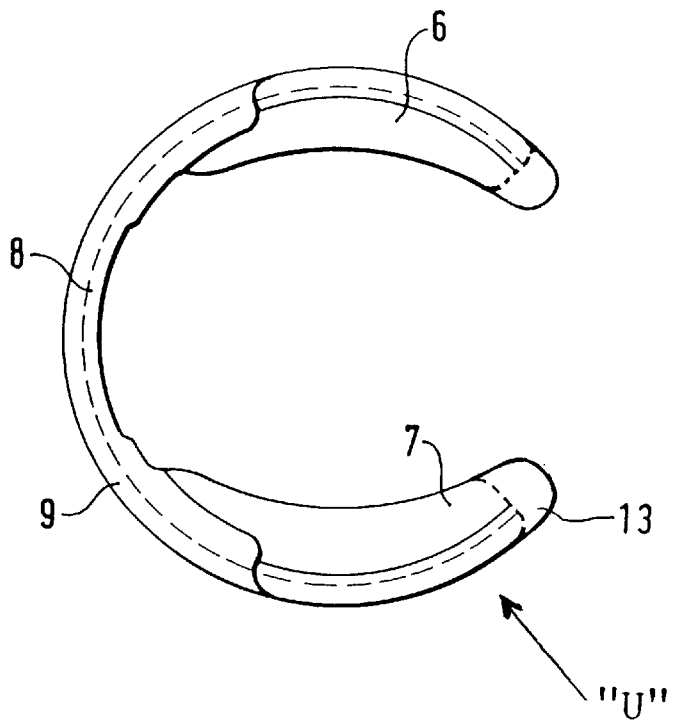
Figure 5A:
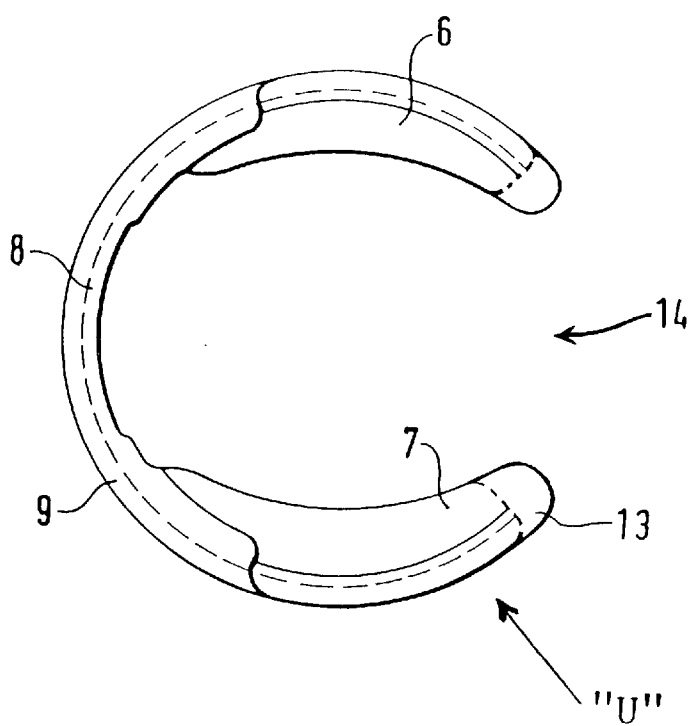
FIG. 5A shows additional detail of the view shown in FIG. 5.
Figure 6:
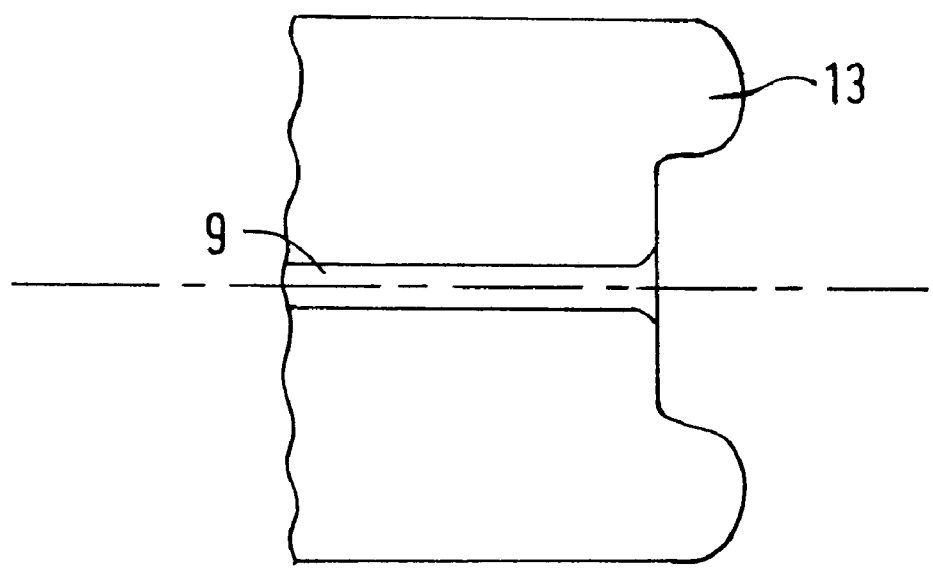

FIGS. 3 and 3A are details which illustrate an assembly which combines the two stop bodies 6 and 7 and the flow connection 9 into a single assembly. The element 8 which contains the flow connection 9 has the stop bodies 6 and 7 on both ends, whereby the stop bodies 6 and 7 are diametrically opposite one another.

FIGS. 4, 4A, 5, 5A and 6 illustrate an embodiment which, in contrast to FIGS. 2 and 3, has an element which is provided with projections 13. The projections 13 are supported on the rubber part 3, so that a bias is generated which acts in the direction of a radial enlargement of the outside diameter of the elements 8. As a result of this bias, the shape of the hydraulic connection remains stable, and a contact force acts constantly in the direction of the inside wall of the outer tube 2. The rubber part 3 can thereby also be provided with a reinforcement 15 on which the projections 13 are supported.

FIGS. 3, 3A, 4, 4A, 5 and 5A show that the element 8 is essentially U-shaped, whereby the clear width of the opening 14 is larger than the outside diameter of the inner tube 1, and if necessary, also of the stops located on the inner tube, so that the rigid, one-piece element 8, before the introduction of the assembly into the outer tube 2, can be easily slipped on for installation. Because the hydraulic connection 9 is provided on the outside of the element 8, the entire peripheral length of the element 8 can be used.

One feature of the invention resides broadly in the hydraulically damping rubber bearing, consisting of an inner tube, an outer tube located concentrically or eccentrically in relation to the inner tube and at some distance from it, and a rubber part inserted between them in which there are at least two chambers which are filled with damping fluid and are hydraulically connected to one another, in each of which there is a stop body, whereby the stop bodies are connected to one another by an element which has a hydraulic connection, the element thereby has a groove which is open toward the radial outside, and is located on the inside of the outer tube so that the groove, together with the inside of the outer tube, forms the hydraulic connection, characterized by the fact that the element 8 is realized in one piece, whereby the element 8 has an opening 14 over its axial length, the clear width of which opening is greater than the diameter of the inner tube 1.

Another feature of the invention resides in that in each of at least two chambers 4, 5 there are respective stop bodies 6, 7, whereby the stop bodies 6, 7 are connected to one another by means of an element 8 which has a hydraulic connection 9.

Another feature of the invention resides broadly in the rubber bearing characterized by the fact that the stop bodies 6, 7 are fixed in position in the outer area on the inside of the outer tube 2.

Yet another feature of the invention resides broadly in the rubber bearing characterized by the fact that the element 8, in the vicinity of the opening 14, has projections which provide the support on the rubber part 3.

Yet another feature of the invention resides broadly in the rubber bearing characterized by the fact that the element 8 has a groove which is open toward the radial outside, and the element is located on the inside of the outer tube 2, so that the groove, together with the inside of the outer tube 2, forms the hydraulic connection 9.

Still another feature of the invention resides broadly in the rubber bearing characterized by the fact that the stop bodies 6, 7 and the element 8 are realized as one piece.

A further feature of the invention resides broadly in the rubber bearing characterized by the fact that the stop bodies 6, 7 have a greater hardness than the rubber part 3.

Another feature of the invention resides broadly in the rubber bearing characterized by the fact that the stop bodies 6, 7 and/or the element 8 are made of plastic and/or hard rubber and/or metal.

Yet another feature of the invention resides broadly in the rubber bearing characterized by the fact that the inner tube 1 is provided with elastic projections 10 which interact with the stop bodies 6, 7.

Still another feature of the invention resides broadly in the rubber bearing characterized by the fact that the stop bodies 6, 7 have a surface which is provided with elevations and/or depressions.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Examples of bearings, components of which may be incorporated in embodiments of the present invention, and in which the present invention may be utilized, may be found in the following U.S. Pat. Nos. 4,741,521; 4,789,144; 4,781,362; 4,896,867; 4,899,996; 4,982,938; 4,958,811; 4,955,588; 4,953,833; 5,149,067; 5,048,803; 5,100,114; 5,165,669; 5,205,545; 5,228,663; 5,181,698; 5,386,973; 5,340,094; 5,624,317; 5,641,152; 5,569,088; 5,601,492; 5,613,589; and 5,492,310.

Further examples of bearings, components of which may be incorporated in embodiments of the present invention, may be found in the following U.S. Pat. Nos. 5,382,194; 5,401,008; 5,407,282; 5,437,439; 5,442,883; 5,449,322; and 5,474,284.

The corresponding foreign patent publication applications, namely, Federal Republic of Germany Patent Application No. 196 39 557.7-12, filed on Sep. 26, 1996, having inventors Heinrich Meyer and Detlef Waloszyk, and DE-OS 196 39 557.7-12 and DE-PS 196 39 557.7-12, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically damping elastomeric bearing for use in a motor mount of a motor vehicle, comprising:

an inner tube structure;

said inner tube structure comprising an inner tube;

said inner tube having a longitudinal axis and defining an axial direction along said longitudinal axis and defining a radial direction transverse to said axial direction;

said inner tube having an outer diameter;

an outer tube;

said outer tube being disposed about said inner tube;

said inner tube being displaceable in the radial direction with respect to said outer tube;

an arrangement to separate said inner tube and said outer tube;

said separating arrangement being disposed between said inner tube and said outer tube;

said separating arrangement defining at least two chambers;

hydraulic fluid being disposed in said at least two chambers;

two stop bodies;

one of said two stop bodies being disposed within one of said at least two chambers;

the other of said two stop bodies being disposed within the other of said at least two chambers;

a one-piece connecting element;

said connecting element being disposed to connect said stop bodies to one another;

said stop bodies and said connecting element together comprising a unitary one-piece structure;

said connecting element comprising a flow channel to allow said hydraulic fluid to flow between said at least two chambers;

said connecting element comprising an opening in the axial direction;

said opening having a width defined substantially transverse to the axial direction;

the outer diameter of said inner tube being less than the width of said opening in said connecting element;

said inner tube structure comprising two portions;

each of said two portions of said inner tube structure being disposed to make contact with its corresponding one of said two stop bodies;

one of said two contact portions being disposed within one of said at least two chambers to correspond to its corresponding stop body disposed within its corresponding chamber;

the other of said two contact portions being disposed within the other of said at least two chambers to correspond to its corresponding stop body disposed within its corresponding chamber;

each of said two contact portions being disposed at least substantially adjacent to its corresponding stop body;

each of said stop bodies being configured to stop movement in the radial direction of its corresponding contact portion upon its corresponding contact portion being displaced in the radial direction against its corresponding stop body; and each of said two contact portions being disposed to permit said hydraulic fluid to flow between each contact portion and its corresponding stop body upon displacement of each contact portion away from its corresponding stop body.

2. The hydraulically damping elastomeric bearing according to claim 1 wherein:

said connecting element has a first side and a second side;

said first side is disposed adjacent said outer tube;

said second side is disposed adjacent said inner tube;

said flow channel is disposed on said first side of said connecting element;

said flow c groove in said first surface of said connecting element;

said outer tube comprises an inner surface disposed adjacent to said connecting element;

said groove and said inner surface of said outer tube form a closed connection to minimize leakage of said hydraulic fluid upon flow of said hydraulic fluid between said at least two chambers;

each of said stop bodies is disposed on said inner surface of said outer tube; and said separating arrangement comprises rubber.

3. A hydraulically damping elastomeric bearing comprising:

an inner tube structure;

said inner tube structure comprising an inner tube;

said inner tube having a longitudinal axis and defining an axial direction along the longitudinal axis and a radial direction transverse to the longitudinal axis;

said inner tube having an outer diameter;

an outer tube;

said outer tube being disposed about said inner tube;

said inner tube being displaceable in the radial direction with respect to said outer tube;

an arrangement to separate said inner tube and said outer tube;

said separating arrangement being disposed between said inner tube and said outer tube;

said separating arrangement forming at least two chambers;

hydraulic fluid being disposed in said at least two chambers;

two stop bodies;

one of said two stop bodies being disposed within one of said at least two chambers;

the other of said two stop bodies being disposed within the other of said at least two chambers;

a connecting element;

said connecting element being disposed to connect said stop bodies to one another;

said connecting element comprising a flow channel to allow said hydraulic fluid to flow between said at least two channels;

said connecting element comprising an opening defined in the axial direction;

said opening having a width substantially transverse to the axial direction;

the outer diameter of said inner tube being less than the width of said opening in said connecting element;

said inner tube structure comprising two portions;

each of said two portions of said inner tube structure being disposed to make contact with its corresponding one of said two stop bodies;

one of said two contact portions being disposed within one of said at least two chambers to correspond to its corresponding stop body disposed within its corresponding chamber;

the other of said two contact portions being disposed within the other of said at least two chambers to correspond to its corresponding stop body disposed within its corresponding chamber;

each of said two contact portions being disposed at least substantially adjacent to its corresponding stop body;

each of said stop bodies being configured to stop movement in the radial direction of its corresponding contact portion upon its corresponding contact portion being displaced in the radial direction against its corresponding stop body; and each of said two contact portions being disposed to permit said hydraulic fluid to flow between each contact portion and its corresponding stop body upon displacement of each contact portion away from its corresponding stop body.

4. The hydraulically damping elastomeric bearing according to claim 3, wherein said connecting element and said two stop bodies comprise a single component.

5. The hydraulically damping elastomeric bearing according to claim 4 wherein:

said connecting element has a first side and a second side;

said first side is disposed adjacent said outer tube;

said second side is disposed adjacent said inner tube; and said flow channel is disposed on said first side of said connecting element.

6. The hydraulically damping elastomeric bearing according to claim 5 wherein:

said flow channel comprises a groove in said first surface of said connecting element;

said outer tube comprises an inner surface disposed adjacent to said connecting element; and said groove and said inner surface of said outer tube form a closed connection to minimize leakage of said hydraulic fluid upon flow of said hydraulic fluid between said at least two chambers.

7. The hydraulically damping elastomeric bearing according to claim 6 wherein each of said stop bodies is disposed on said inner surface of said outer tube.

8. The hydraulically damping elastomeric bearing according to claim 7 wherein said separating arrangement comprises a rubber portion.

9. The hydraulically damping elastomeric bearing according to claim 8 wherein:

said connecting element comprises at least one projection;

said at least one projection is disposed adjacent to said opening in said connecting element; and said at least one projection is disposed and configured to support said separating element.

10. The hydraulically damping rubber bearing according to claim 9 wherein:

each said contact portion comprises an elastic material;

each said contact portion is disposed to project toward said outer tube; and each said contact portion is disposed to interact with its corresponding one of said stop bodies.

11. The hydraulically damping rubber bearing according to claim 10 wherein:

said stop bodies comprise a surface;

said surface of said stop bodies is disposed to project towards said inner tube; and said surface of said stop bodies comprises at least one of: elevated portions and recessed portions.

12. The hydraulically damping elastomeric bearing according to claim 11 wherein:

said connecting element comprises one of a), b) and c):
a) plastic;
b) rubber; and
c) metal; and said stop bodies comprise one of a), b) and c):
a) plastic;
b) rubber; and
c) metal.

13. The hydraulically damping elastomeric bearing according to claim 12 wherein said one of: plastic, rubber and metal of said stop bodies has a hardness greater than the hardness of the rubber portion of said separating arrangement.

14. A hydraulically damping elastomeric bearing comprising:

an inner tube structure;

said inner tube structure comprising an inner tube;

said inner tube having a longitudinal axis and defining an axial direction along said longitudinal axis and defining a radial direction transverse to said axial direction;

said inner tube having an outer diameter;

an outer tube;

said outer tube being disposed about said inner tube;

said inner tube being movable in the radial direction with respect to said outer tube;

an arrangement to separate said inner tube and said outer tube;

said separating arrangement being disposed between said inner tube and said outer tube;

said separating arrangement defining at least two chambers;

hydraulic fluid being disposed in said at least two chambers;

two stop bodies;

one of said two stop bodies being disposed within one of said at least two chambers;

the other of said two stop bodies being disposed within the other of said at least two chambers;

a connecting element;

said connecting element being disposed to connect each of said stop bodies to one another;

said connecting element comprising a flow channel to allow said hydraulic fluid to flow between said at least two chambers;

said connecting element being a one-piece element;

said inner tube structure comprising two portions;

each of said two portions of said inner tube structure being disposed to make contact with its corresponding one of said two stop bodies;

one of said two contact portions being disposed within one of said at least two chambers to correspond to its corresponding stop body disposed within its corresponding chamber;

the other of said two contact portions being disposed within the other of said at least two chambers to correspond to its corresponding stop body disposed within its corresponding chamber;

each of said two contact portions being disposed at least substantially adjacent to its corresponding stop body;

each of said stop bodies being configured to stop movement in the radial direction of its corresponding contact portion upon its corresponding contact portion being displaced in the radial direction against its corresponding stop body; and each of said two contact portions being disposed to permit said hydraulic fluid to flow between each contact portion and its corresponding stop body upon displacement of each contact portion away from its corresponding stop body.

15. The hydraulically damping elastomeric bearing according to claim 14, wherein:

said connecting element comprises an opening in the axial direction;

said opening has a width substantially transverse to the axial direction; the outer diameter of said inner tube is less than the width of said opening in said connecting element; and said connecting element and said stop bodies form an integral one-piece unit.

16. The hydraulically damping elastomeric bearing according to claim 15 wherein:

said connecting element has a first side and a second side;

said first side is disposed adjacent said outer tube;

said second side is disposed adjacent said inner tube;

said flow channel is disposed on said first side of said connecting element;

said flow channel comprises a groove in said first surface of said connecting element;

said outer tube comprises an inner surface disposed adjacent to said connecting element; and said groove and said inner surface of said outer tube form a closed connection to minimize leakage of said hydraulic fluid upon flow of said hydraulic fluid between said at least two chambers;

each of said stop bodies is disposed on said inner surface of said outer tube; and said separating arrangement comprises rubber.

17. The hydraulically damping elastomeric bearing according to claim 16 wherein:

said connecting element comprises at least one projection;

said at least one projection is disposed adjacent to said opening in said connecting element;

said at least one projection is disposed and configured to support said separating element;

said contact portions comprise an elastic material;

said contact portions are disposed to project toward said outer tube;

each said contact portion is disposed to interact with its corresponding stop body;

said stop bodies comprise a surface:

said surface of said stop bodies is disposed to project towards said inner tube; and said surface of said stop bodies comprises at least one of:

elevated portions and recessed portions.

18. The hydraulically damping elastomeric bearing according to claim 17 wherein:

said connecting element comprises one of a), b) and c):

a) plastic;
b) rubber; and
c) metal; and said stop bodies comprise one of a), b) and c):

a) plastic;
b) rubber; and
c) metal.

19. The hydraulically damping elastomeric bearing according to claim 18, wherein said one of: plastic, rubber or metal of said stop bodies has a hardness greater than the hardness of the rubber portion of said separating arrangement.

* * * * *

UNITED STATES PATENT AND TRADEMARK OFFICE
CERTIFICATE OF CORRECTION

PATENT NO. : 5,954,317  
DATED : September 21, 1999  
INVENTOR(S) : Heinrich Meyer and Detlef Waloszyk Page 1 of 1

It is certified that error appears in the above-identified patent and that said Letters Patent is hereby corrected as shown below:

Column 3,  
Line 50, after "means" insert -- of an --.

Column 7,  
Line 29, claim 2, after "flow", delete "c" and insert -- channel comprises a --.

Claim 3, column 8,  
Line 6, after "two", delete "channels;" and insert -- chambers; --.

Signed and Sealed this

Second Day of October, 2001

Attest:

NICHOLAS P. GODICI  
Attesting Officer    Acting Director of the United States Patent and Trademark Office